US010810304B2

United States Patent
Gupta et al.

(10) Patent No.: US 10,810,304 B2
(45) Date of Patent: Oct. 20, 2020

(54) INJECTING TRAP CODE IN AN EXECUTION PATH OF A PROCESS EXECUTING A PROGRAM TO GENERATE A TRAP ADDRESS RANGE TO DETECT POTENTIAL MALICIOUS CODE

(71) Applicant: INTERNATIONAL BUSINESS MACHINES CORPORATION, Armonk, NY (US)

(72) Inventors: Lokesh M. Gupta, Tucson, AZ (US); Matthew G. Borlick, Tucson, AZ (US); Trung N. Nguyen, Vail, AZ (US); Micah Robison, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 15/954,334

(22) Filed: Apr. 16, 2018

(65) Prior Publication Data

US 2019/0318081 A1    Oct. 17, 2019

(51) Int. Cl.
  *G06F 21/52*    (2013.01)
  *G06F 9/30*    (2018.01)
  *G06F 8/70*    (2018.01)

(52) U.S. Cl.
  CPC ............... *G06F 21/52* (2013.01); *G06F 8/70* (2013.01); *G06F 9/30058* (2013.01); *G06F 2221/033* (2013.01)

(58) Field of Classification Search
  CPC ........ G06F 21/52; G06F 8/70; G06F 9/30058; G06F 2221/033
  See application file for complete search history.

(56) References Cited

U.S. PATENT DOCUMENTS 5,956,751 A    9/1999 Lai
7,302,619 B1    11/2007 Tompkins et al.
(Continued)

FOREIGN PATENT DOCUMENTS

CN    101944041 A    1/2011
CN    102667794 A    9/2012
(Continued)

OTHER PUBLICATIONS

"How the Meltdown and Spectre bugs work and what you can do to prevent a performance plummet", Ellexus, https://www.ellexus.com/wp-content/uploads/2018/01/180107-Meltdown-and-Spectre-white-paper, pp. 5.

(Continued)

*Primary Examiner* — Joseph P Hirl
*Assistant Examiner* — Stephen T Gundry
(74) *Attorney, Agent, or Firm* — David W. Victor; Konrad, Raynes, Davda and Victor LLP (57) ABSTRACT

Provided are a computer program product, system, and method for injecting trap code in an execution path of a process executing a program to generate a trap address range to detect potential malicious code. A specified type of command is processed in application code and, in response, trap code is executed to allocate a trap address range. The specified type of command is executed in the application code. A determination is made as to whether an accessing application accesses the trap address range. At least one of transmitting a notification that the accessing application comprises potentially malicious code, monitoring the execution of the accessing application, and restricting execution of the accessing application is performed in response to determining that the accessing application accessed the trap address range.

26 Claims, 6 Drawing Sheets

(56) References Cited

U.S. PATENT DOCUMENTS

| | | | |
|---|---|---|---|
| 7,971,255 B1 | 6/2011 | Kc et al. | |
| 8,515,075 B1 | 8/2013 | Saraf et al. | |
| 9,038,176 B2* | 5/2015 | Sallam | G06F 21/554 |
| | | | 718/1 |
| 9,407,648 B1* | 8/2016 | Pavlyushchik | G06F 9/544 |
| 9,471,514 B1 | 10/2016 | Badishi et al. | |
| 9,594,629 B2 | 3/2017 | AlJuffri et al. | |
| 9,690,502 B2 | 6/2017 | Pawlowski | |
| 9,734,334 B2* | 8/2017 | Goel | G06F 21/52 |
| 10,157,277 B2* | 12/2018 | LeMay | G06F 21/121 |
| 10,467,407 B2* | 11/2019 | Frank | G06F 21/52 |
| 2008/0216175 A1* | 9/2008 | Pike | G06F 21/52 |
| | | | 726/22 |
| 2012/0254995 A1* | 10/2012 | Sallam | G06F 21/554 |
| | | | 726/22 |
| 2012/0255004 A1* | 10/2012 | Sallam | G06F 21/554 |
| | | | 726/23 |
| 2012/0255012 A1* | 10/2012 | Sallam | H04L 63/145 |
| | | | 726/24 |
| 2013/0024939 A1 | 1/2013 | Glew et al. | |
| 2013/0276056 A1* | 10/2013 | Epstein | G06F 9/45558 |
| | | | 726/1 |
| 2014/0181976 A1 | 6/2014 | Snow et al. | |
| 2015/0199514 A1* | 7/2015 | Tosa | G06F 21/554 |
| | | | 726/17 |
| 2015/0248557 A1* | 9/2015 | Sallam | G06F 21/52 |
| | | | 726/23 |
| 2015/0339480 A1* | 11/2015 | Lutas | G06F 9/30058 |
| | | | 726/22 |
| 2016/0048679 A1* | 2/2016 | Lutas | G06F 12/1009 |
| | | | 726/23 |
| 2016/0048680 A1* | 2/2016 | Lutas | G06F 9/45558 |
| | | | 726/23 |
| 2016/0070912 A1* | 3/2016 | Goel | G06F 21/52 |
| | | | 726/23 |
| 2016/0072830 A1* | 3/2016 | Goel | G06F 21/566 |
| | | | 726/23 |
| 2016/0085992 A1* | 3/2016 | Boivie | G06F 11/3664 |
| | | | 726/27 |
| 2016/0139989 A1 | 5/2016 | Muralimanohar et al. | |
| 2016/0180079 A1* | 6/2016 | Sahita | G06F 9/30061 |
| | | | 726/22 |
| 2017/0004309 A1* | 1/2017 | Pavlyushchik | G06F 21/566 |
| 2017/0116419 A1* | 4/2017 | Woodward | G06F 12/10 |
| 2018/0004946 A1* | 1/2018 | LeMay | G06F 21/566 |
| 2018/0075236 A1* | 3/2018 | Kwon | G06F 21/44 |
| 2018/0096136 A1* | 4/2018 | LeMay | G06F 12/00 |
| 2018/0247069 A1* | 8/2018 | Tang | G06F 21/52 |
| 2018/0285561 A1* | 10/2018 | Frank | G06F 21/562 |
| 2019/0005231 A1* | 1/2019 | Peleg | G06F 21/566 |
| 2019/0034633 A1* | 1/2019 | Seetharamaiah | G06F 21/604 |
| 2019/0121571 A1 | 4/2019 | Wahla et al. | |
| 2019/0121964 A1* | 4/2019 | LeMay | G06F 21/121 |
| 2019/0243776 A1* | 8/2019 | Amit | G06F 12/1441 |
| 2019/0243965 A1* | 8/2019 | Wei | G06F 21/52 |
| 2019/0243966 A1* | 8/2019 | Wei | G06F 12/1441 |
| 2020/0012787 A1* | 1/2020 | Frank | G06F 9/45558 |

FOREIGN PATENT DOCUMENTS

| | | |
|---|---|---|
| CN | 107818245 A | 3/2018 |
| WO | 2012040045 | 3/2012 |

OTHER PUBLICATIONS

"Code Injection", Wikipedia, [online][retrieved Feb. 21, 2018] https://en.wikipedia.org/wiki/Code_injection, pp. 5.

"Command Injection", OWASP, [online][retrieved Feb. 21, 2018] https://www.owasp.org/index.php/Command_Injection, pp. 3.

U.S. Application, dated Apr. 16, 2018, for U.S. Appl. No. 15/954,341 (18.798), filed Apr. 16, 2018, invented by Lokesh M. Gupta et al., Total 41 pages.

List of IBM Patents or Patent Applications Treated as Related, dated Apr. 16, 2018, Total 2 pp.

Machine Translation for CN101944041A, published Jan. 12, 2011, Total 12 pages.

Machine Translation for CN102667794A, published Sep. 12, 2012, Total 13 pages.

Machine Translation for CN107818245A, published Mar. 20, 2018, Total 18 pages.

International Search Report and Written Opinion, dated Jul. 3, 2019, Total 9 pages.

20180075236 is the English publication for CN107818245A.

Office Action, dated May 22, 2020, for U.S. Appl. No. 15/954,341 (18.798), filed Apr. 16, 2018, invented by Lokesh M. Gupta et al., Total 32 pages.

Interview Summary, dated Aug. 14, 2020, for U.S. Appl. No. 15/954,341 (18.798), filed Apr. 16, 2018, invented by Lokesh M. Gupta et al., Total 7 pages.

\* cited by examiner

INJECTING TRAP CODE IN AN EXECUTION PATH OF A PROCESS EXECUTING A PROGRAM TO GENERATE A TRAP ADDRESS RANGE TO DETECT POTENTIAL MALICIOUS CODE

BACKGROUND OF THE INVENTION

1. Field of the Invention

The present invention relates to a computer program product, system, and method for injecting trap code in an execution path of a process executing a program to generate a trap address range to detect potential malicious code.

2. Description of the Related Art

Anti-malware software, also known as anti-virus software, is used to detect, prevent and remove malicious software, such as malicious browser helper objects (BHOs), browser hijackers, ransomware, key loggers, backdoors, rootkits, Trojan horses, worms, malicious LSPs, dialers, fraud tools, adware and spyware. Typically when there is a possible data breach from malicious software, access to the data subject to the breach is blocked until the security threat is resolved, so as to avoid any alteration of data by the suspicious software. One type of malicious software known as ransomware encrypts user data, and then the operator of the ransomware blackmails the victim of the attack requiring payment for the encryption key to use to decrypt their data.

Malicious code may try to access data in protected memory by reading memory data from protected memory stored in a system cache as part of caching operations. Protected memory comprises a region of the system memory that processes should not be able to access unless the process has permission to access. Legitimate processes may store certain protected data not intended for other applications in the protected memory, such as personal information, passwords, etc. Protected data from protected memory stored in cache may be accessed by malicious code in a side-channel attack where malicious code takes advantage of knowing that certain cached data in the cache is from kernel addresses and may contain sensitive and confidential protected data.

There is a need in the art for improved techniques for detecting malicious code attempting to access protected data stored in cache to prevent malevolent activity and compromising data.

SUMMARY

A first embodiment provides a computer program product, system, and method for injecting trap code in an execution path of a process executing a program to generate a trap address range to detect potential malicious code. A specified type of command is processed in application code and, in response, trap code is executed to allocate a trap address range. The specified type of command is executed in the application code. A determination is made as to whether an accessing application accesses the trap address range. At least one of transmitting a notification that the accessing application comprises potentially malicious code, monitoring the execution of the accessing application, and restricting execution of the accessing application is performed in response to determining that the accessing application accessed the trap address range.

With the first embodiment, execution of a specified type of command, such as a command that could provide access to a protected address space or sensitive data, triggers execution of trap code that allocates a trap address range. If an application tries to access that trap address range, which would not be an address range accessed by the application code being executed, then an assumption can be made that the accessing application is malicious or has a bug that causes it to access a trap address range, not allocated for the application. Once such an access to a trap address range is detected, then protective actions may be taken with respect to the application code, such as blocking, monitoring, etc. In this way, the threat monitor program limits monitoring to not everything an application does, but provides more focused monitoring of situations where a malicious program would seek to take advantage of a specified type of command in the application code that may provide access to sensitive information. The described embodiments trigger allocating trap address ranges when such a specified type of command that could provide access to sensitive data is executed, and the malicious code can be detected by trying to access a trap address range which would not be accessed by a legitimate application.

In a second embodiment, the specified type of command comprises a command to switch from a user mode to kernel mode to access kernel addresses, and wherein the trap address range is defined in a kernel address space.

With the second embodiment, the trap address range is allocated when the application switches to kernel mode to access kernel addresses, because kernel addresses may provide access to sensitive and protected data that malicious programs would seek to access and exploit. Thus, by allocating trap address ranges when kernel addresses are accessed by the application, the described embodiments create the trap for malicious code at the point in the application program where access to sensitive information may be provided. This further increases the likelihood of capturing malicious code because malicious code may seek to exploit addresses, such as the trap address range, allocated with code that provides access to the kernel address space.

In a third embodiment, a segmentation fault is received in response to the accessing application accessing an address in the kernel address space not mapped in an address table to valid data in a cache. In such case, the determining whether the accessing application has accessed the trap address range is performed in response to receiving the segmentation fault.

With the third embodiment, the checking whether a program is malicious is performed when a segmentation fault occurs, to check if a kernel address being accessed is within the trap address range. This further improves the efficiency of monitoring operations by limiting processor checking for malicious programs to those points where a malicious program is likely to access data, when accessing a kernel address that throws a segmentation fault.

In a fourth embodiment, the specified type of command comprises a system call, wherein the system call is executed after executing the trap code.

With the fourth embodiment, the specified type of command that triggers allocating the trap address range comprises a system call. This further improves the efficiency of operations by tying the trap addresses to system calls because system calls switch from a user mode to a kernel mode to access the kernel address space. Thus, malicious programs may look for address ranges allocated with system calls. In this way, the described embodiments improve the efficiency of monitoring for malicious code by tying the allocation of the trap address range to a type of call, system calls, that are more likely to be targeted by malicious programs than other types of calls.

In a fifth embodiment, the trap address range maps to invalid physical addresses in an address table, wherein the determining whether the accessing application has accessed the trap address range comprises detecting a fault generated when the accessing application accesses the trap address range mapping to invalid locations.

With the fifth embodiment, by mapping a trap address range to invalid physical addresses, a segmentation fault will occur when a program, likely to be a malicious program, tries to access the trap address range. This further optimizes monitoring operations by not requiring continual monitoring, and the monitoring is only triggered when there is higher probability of an access by malicious code, which occurs when a program tries to access a trap address range not mapping to valid physical addresses, and can be flagged by a segmentation fault, which is part of normal operating system processes.

In a sixth embodiment, the executing the trap code maps the trap address range in an address table, wherein the determining whether the accessing application has accessed the trap address range comprises detecting that the accessing application attempts to use trap data from the trap address range to access computational resources.

With the sixth embodiment, trap data, such as fake identifiers and passwords, is placed in the trap address range, which is not used by valid application programs. Thus, if a program is presenting the identifiers and passwords from the trap data to access computational resources, such access is most likely malicious. With this embodiment, monitoring operations do not waste resources on monitoring programs that are not malicious and focus on accesses that are highly likely to be from malicious programs, or a non-malicious program having a bug.

In a seventh embodiment, the processor executing the application code speculatively executes both branches of conditional branches of the application code, wherein a result of only one of the conditional branches is maintained depending on a condition used to determine which of the conditional branches to traverse.

In an eighth embodiment, the trap code is executed in a conditional branch of the conditional branches speculatively by a processor when processing the conditional branches.

With the seventh and eighth embodiments, trap code may be executed when a processor is speculatively executing code. This further increases the efficiency of malicious program monitoring because malicious programs may seek to take advantage of sensitive data left in memory as a result of speculative execution. In this way, by allocating the trap address range during speculative execution, the described embodiments are more likely to observe malicious code trying to access sensitive data stored in memory during speculative execution.

DETAILED DESCRIPTION

In speculative execution, a processor will speculatively execute application code ahead of the application process in the execution path to make parameters and data available to the application process when it eventually reaches the point in the program at which the speculative execution of the application code occurred. If the speculative execution reaches a conditional branch of different paths of execution depending on a condition, such as a value of a previously determined parameter, then the processor speculative execution will process the application code in all the conditional branches to pre-calculate parameters and values to be available regardless of which path of the conditional branches the application process will traverse. This substantially increases the speed of the application process by being able to use the speculatively generated parameters and information without having to execute the application code.

In the current art, when a process speculatively executing code processes a system call in a conditional branch to access data in kernel addresses, the accessed data, which may comprise sensitive and personal information, may be stored in cache. Further, the accessed data may remain in cache if the application process proceeds down the other branch not including the system call accessing protected data in the kernel. Malicious code may attempt to read cached protected data stored in the cache by the speculative execution.

To address the risks of speculative execution, in the current art, speculative execution may be halted on any conditional branch to avoid leaving protected data in the cache. Another current solution is to flush the cache to remove any protected data or unmap addresses to the protected data. However, these solutions, by eliminating parameters and other information speculatively generated in advance of the application process will eliminate the benefits of speculative execution that makes data and parameters available in advance of their need by the application process.

Described embodiments provide improvements to computer technology to detect malicious code while allowing processor speculative execution to proceed by executing trap code in response to processing a specified type of command. The trap code allocates a trap address range. The specified type of command may then be executed after executing the trap code. The trap address range would not be an address range used by the application because it was allocated by trap code, which is not part of the application code. When an application attempts to access the trap address range, the application may be considered potentially malicious code and a protective action may be taken, such as performing at least one of transmitting a notification that the accessing application comprises potentially malicious code, monitoring the execution of the accessing application, and restricting execution of the application accessing the trap address range.

Figure 1:
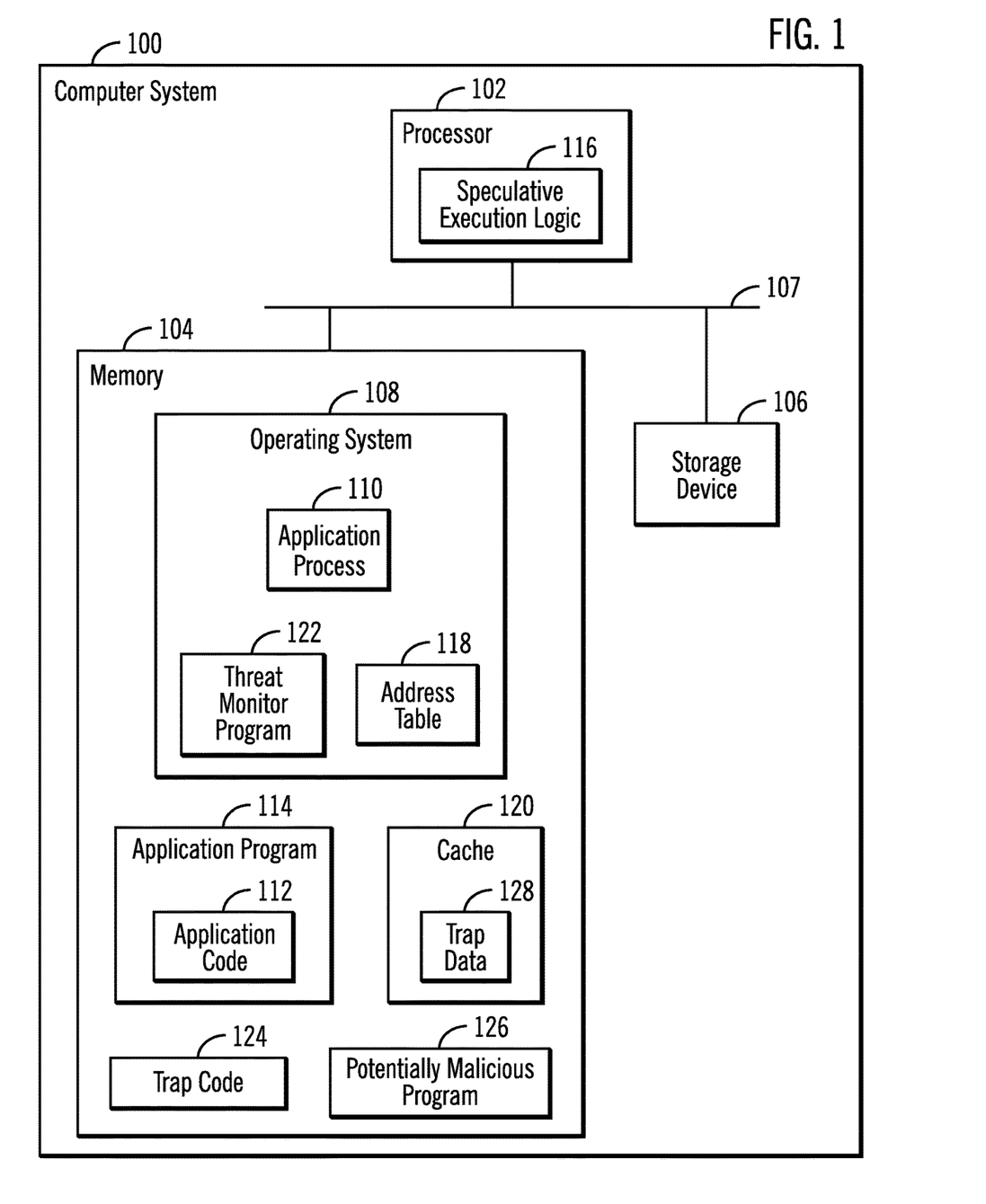
FIG. 1 illustrates an embodiment of a computing environment.

FIG. 1 illustrates an embodiment of a computing environment including a computer system 100 having a processor 102, a memory 104, and a storage device 106 that communicate over a bus 107. The processor 102 may comprise a separate central processing unit (CPU), one or a group of multiple cores on a single CPU, or a group of processing resources on one or more CPUs.

The memory 104 includes an operating system 108 to manage application access to data stored in the storage device 106, and manage the addressing of data as a track, Logical Block Address (LBA), storage cell, group of cells (e.g., column, row or array of cells), sector, segment, etc., which may be part of a larger grouping of tracks, such as a volume, logical device, etc. The operating system 108 may spawn one or more instances of an application process 110 to execute application code 112 in an application program 114, where there may be multiple applications 114. The processor 102 includes speculative execution logic 116 to speculatively execute application code 112 in advance of a position in the execution path at which the application process 110 is executing the application code 112, so that parameters and other information from the speculatively executed application code 112 are available to the application process 110 when it reaches that point in the application code 112 that was speculatively executed. The processor 102 may perform speculative execution on any running process 110.

The operating system 108 maintains an address table 118, also known as a hardware page table (HPT), providing a mapping of logical addresses allocated to applications 114 to a physical location of where the data is stored in a local cache 120 in the memory 104 or in the storage device 106. In certain embodiments, the logical addresses may comprise virtual addresses, where data for the virtual or logical addresses may be stored in the cache 120 in the memory 104 or in the storage device 106, where data for virtual addresses in the storage device 106 needs to be paged into the cache 120 for access by the application process 110 and speculative execution by the processor 102.

The operating system 108 may further include a threat monitor program 122 to determine whether an application 126, executing in the computer system 100 or a remotely connected computer system over a network, issuing Input/Output (I/O) requests comprises a potentially malicious program 126, such as malware, ransomware, virus, and other malicious code.

The memory 104 includes trap code 124 that is injected into the path of speculative execution of the application code 112. The trap code 124 is intended to allocate trap addresses or trap data 128 that would not be accessed by the application program 114, and would likely be accessed by a malicious program seeking to access data to steal, such as in a side-channel attack, or accessed as a result of a bug in a legitimate program. In one embodiment, the trap code 124 may allocate a trap address range of addresses that map to invalid locations, such that access to the trap address range would result in a segmentation fault and alert the operating system 108 to potential malicious activity. In an alternative embodiment, the trap address range may map to trap data 128 added by the trap code 124 to the cache 120, such as fake passwords and user identifiers, that would not be presented by legitimate application programs 114 or valid users. Thus, a potentially malicious application 126 or user that presents trap data 128 to access computational resources in the system 100 are engaged in suspicious activity as a potentially malicious program 126 for which protective action needs to be taken. It may be assumed that ransomware or other malevolent programs would access the trap data 128 as part of operations to steal or encrypt data in the storage 106. A trap address range may be identified and indicated in information and flags of the address table 118.

The memory 104 further includes a threat monitor program 122 to detect suspicious processes that potentially have malicious code, such as a virus, ransomware, etc., based on access to a trap address range and/or trap data 128 created by the trap code 124.

The operating system 108, application program 114, trap code 124, threat monitor program 122 are shown in FIG. 1 as program code loaded into the memory 104 and executed by one or more of the processors 102. Alternatively, some or all of the functions may be implemented as microcode or firmware in hardware devices in the system 100, such as in Application Specific Integrated Circuits (ASICs).

The storage 106 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 104 may comprise a suitable volatile or non-volatile memory devices, including those described above.

Figure 2:
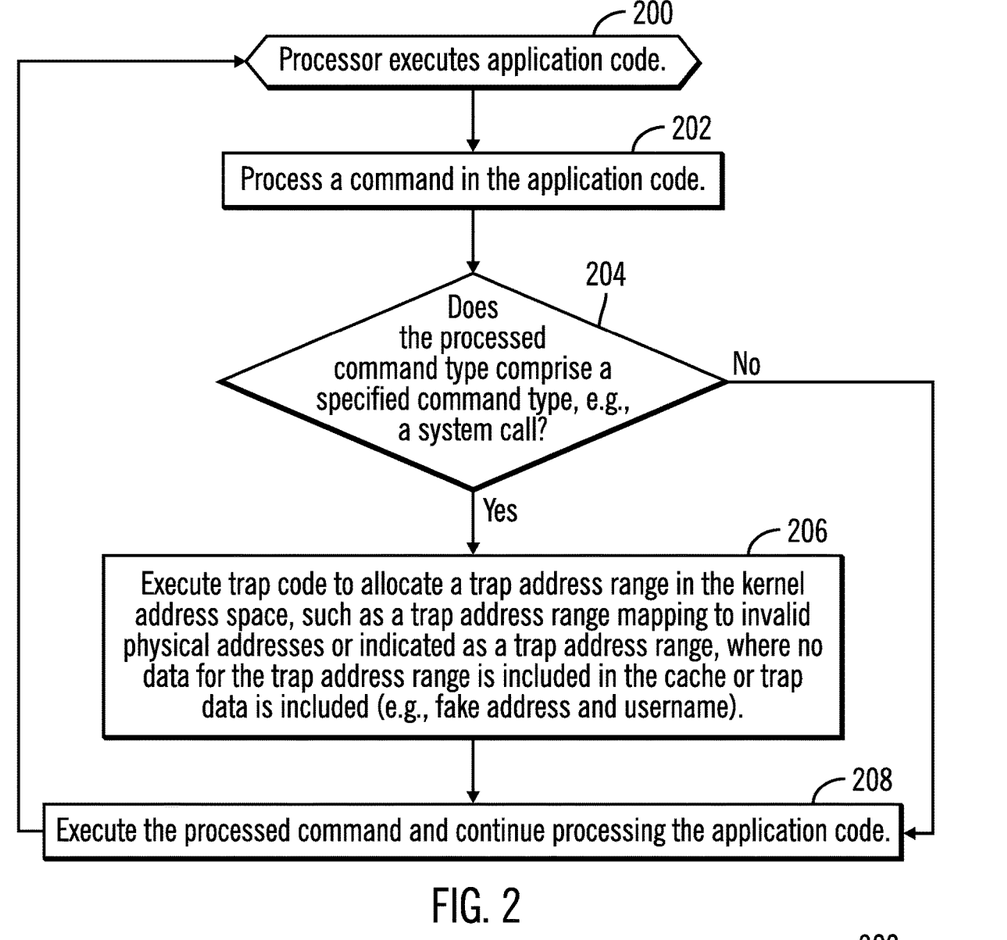
FIG. 2 illustrates an embodiment of operations to inject trap code into an execution path of a process executing application code to allocate a trap address range.

FIG. 2 illustrates an embodiment of operations for the processor 102 executing execution code, which may be part of normal application code processing or speculative execution of the application code 112. Upon initiating (at block 200) an operation to execute application code 112, speculatively or otherwise, the processor 102 processes (at block 202) a command in the application code 112. If (at block 204) the processed command type is a specified command type to trigger execution of trap code 124, such as a system call or call to access the kernel address space, the processor 102 executes (at block 206) trap code 124 to allocate a trap address range in the kernel address space, such as a trap address range mapping to invalid physical addresses or a range for which no data is stored in the cache. Alternatively, the processor 102 may include trap data 128 in the trap address range, such as including a fake username and password. If (at block 204) the process command is not of the specified type or after executing the trap code 124 (at block 206), the processor 102 executes (at block 208) the processed command and continues processing the application code 112, such as speculatively processing code in all conditional branches. There may be multiple instances of trap address ranges created in response to multiple instances of executing the trap code 124 during execution.

Figure 3:
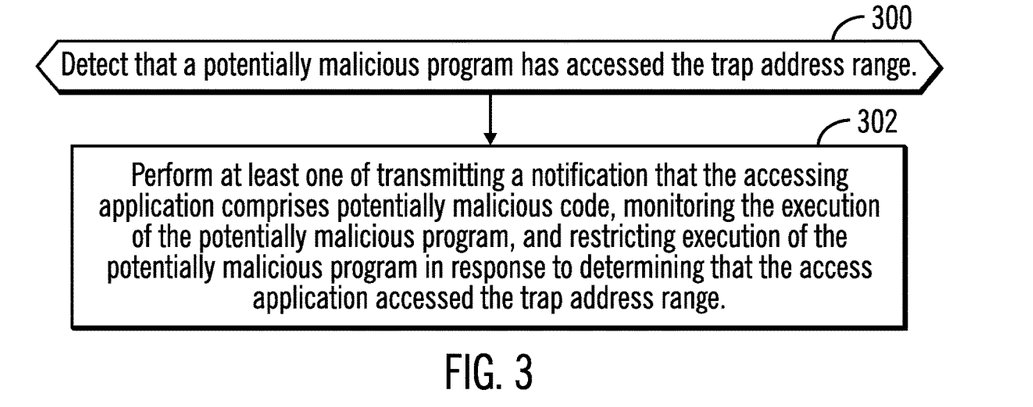
FIG. 3 illustrates an embodiment of operations to detect potentially malicious activity from accesses to the trap address range.

FIG. 3 illustrates an embodiment of operations performed by the threat monitor program 122, which may be part of the operating system 108, to determine whether an application program 126 is a potentially malicious program. Upon detecting (at block 300) that a potentially malicious program 126 has accessed the trap address range, such as issued a read or write to the trap address range, the threat monitor program 122 performs (at block 302) at least one of transmitting a notification to a user or an anti-virus program that the accessing application 126 comprises potentially malicious code, monitoring the execution of the potentially malicious program 126, and restricting execution of the potentially malicious program 126. For instance, the threat monitor program 122 may quarantine the potentially malicious program 126 and alert the user to take further action, such as allow the potentially malicious program 126 to run if it is an authorized program, delete or otherwise block from executing the potentially malicious program 126. In certain embodiments, the monitoring of the potentially malicious program 126 may comprise allowing the program 126 to run in a "honey pot" environment where information is provided to the program 126 in order to monitor how the potentially malicious program 126 interacts in the computer system 100 and which addresses it communicates with over the Internet.

Figure 4:
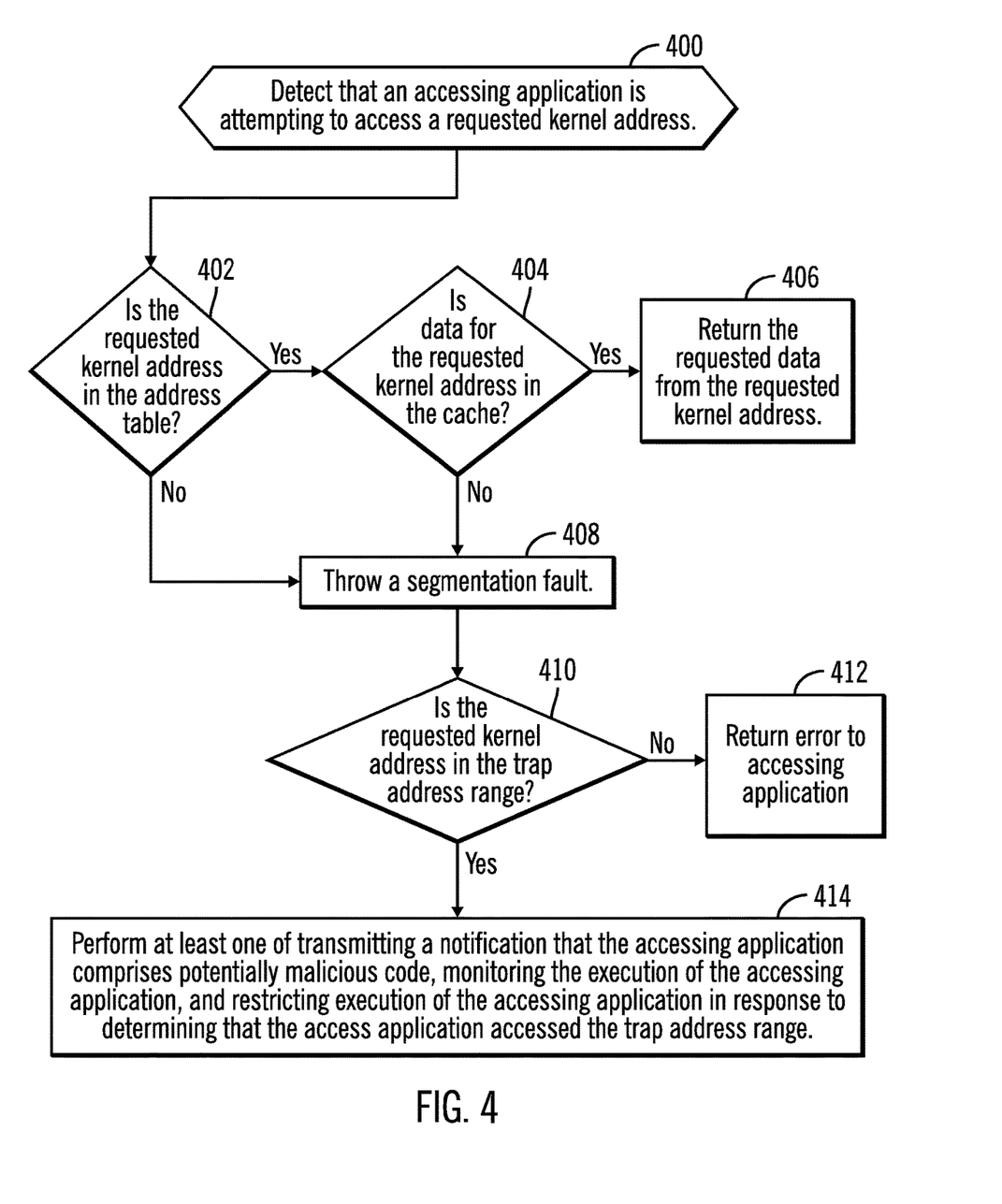
FIG. 4 illustrates an embodiment of operations to detect access to a trap address range when a potentially malicious program is attempting to access a kernel address.

FIG. 4 illustrates an additional embodiment of operations performed by the operating system 108, threat monitor program 122, and/or other program to determine whether an application program 126 is a potentially malicious program when the application attempts to access a kernel address in the kernel address space of the operating system 108. Upon detecting (at block 400) that an application 126, which may be executing in the user space, is attempting to access a requested kernel address, the operating system 108/threat monitor program 122 determines (at block 402) whether the requested kernel address is in the address table 118. If (at block 402) the kernel address is in the address table 118 and if (at block 404) data for the requested kernel address is in the cache 120, then the requested data for the kernel address is returned (at block 406) from the cache 120 to the requesting application. If (at block 402) the requested kernel address is not in the address table 118 or if (at block 404) data for the requested kernel address is not in the cache 120, then a segmentation fault is thrown (at block 408).

In response to the segmentation fault (at block 408), the operating system 108/threat monitor program 122 determines (at block 410) whether the requested kernel address is in the trap address range. If not, then an error is returned to the accessing application (at block 412), which may not be a malicious program 126 because it was not trying to access a trap address, but may comprise a legitimate program receiving a segmentation fault. If (at block 410) the requested kernel address is in the trap address range, then the program 126 may be considered malicious and threat monitor program 122 performs one of the threat handling operations (at block 414) described with respect to the potentially malicious program 126, such as described with respect to block 302 in FIG. 3.

Figure 5:
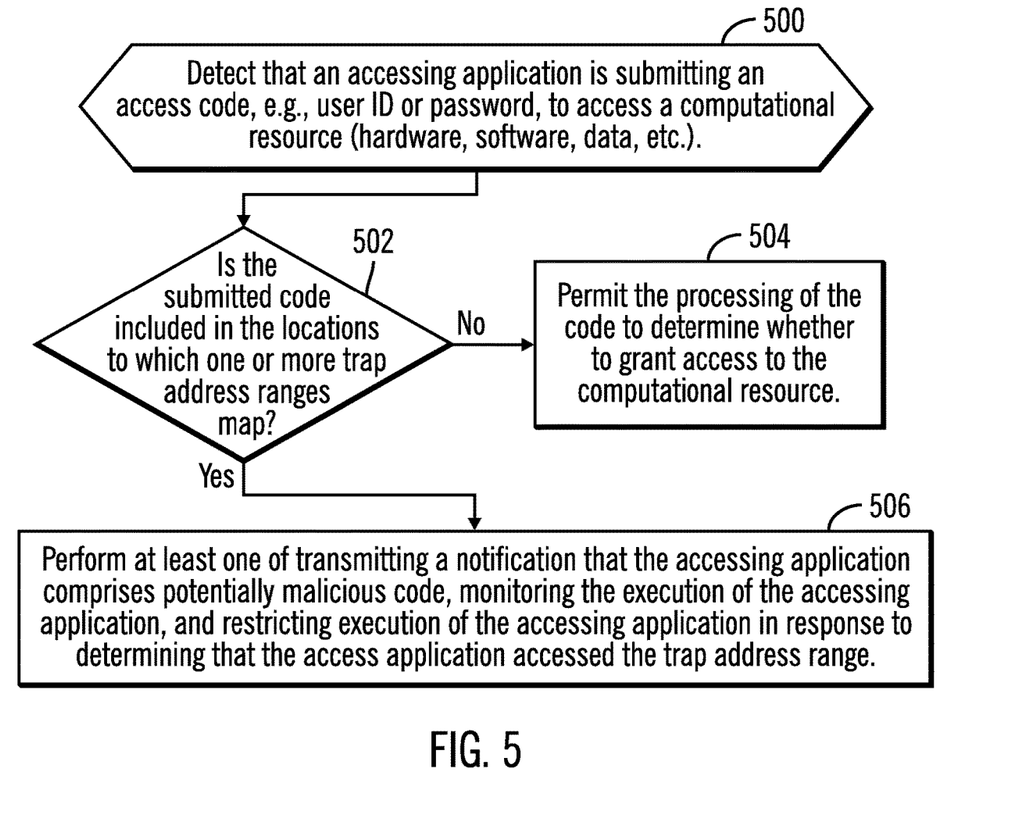
FIG. 5 illustrates an embodiment of operations to detect that a potentially malicious program is submitting a trap code from a trap address range to access computational resources.

FIG. 5 illustrates an additional embodiment of operations performed by the threat monitor program 122, operating system 108 and/or other program to determine whether an application program 126 is a potentially malicious program in an embodiment where trap data 128 are provided at the trap address range, such as having trap passwords and user IDs. Upon detecting (at block 500) that an accessing application 126 is submitting an access code, such as a user ID or password, to access a computational resource, such as a hardware, software or a data resource in or coupled to the computer system 100, the threat monitor program 122/operating system 108 determines (at block 502) whether the submitted code(s) are at locations in the cache 120 or storage 106 addressed by one of the addresses in a trap address range. If (at block 502) the submitted access code is not from a trap address range, then the threat monitor program 122 permits (at block 504) the processing of the code to determine whether access to the requested computational resource is authorized. Otherwise, if (at block 502) the submitted access code is in one of the trap address ranges, then then the threat monitor program 122 performs one of the threat handling operations (at block 506) described with respect to the potentially malicious program 126, such as described with respect to block 302 in FIG. 3.

With the embodiments of FIGS. 4 and 5, if an application is detected trying to access one of the trap address ranges or submitting codes stored in the trap address ranges, then there is a high likelihood that the accessing application comprises malicious code because the trap address ranges were not allocated by application code 112 from a legitimate application program 114, unless the legitimate application program 114 has an error or bug where it is accessing addresses not allocated to the application program 114.

Figure 6:
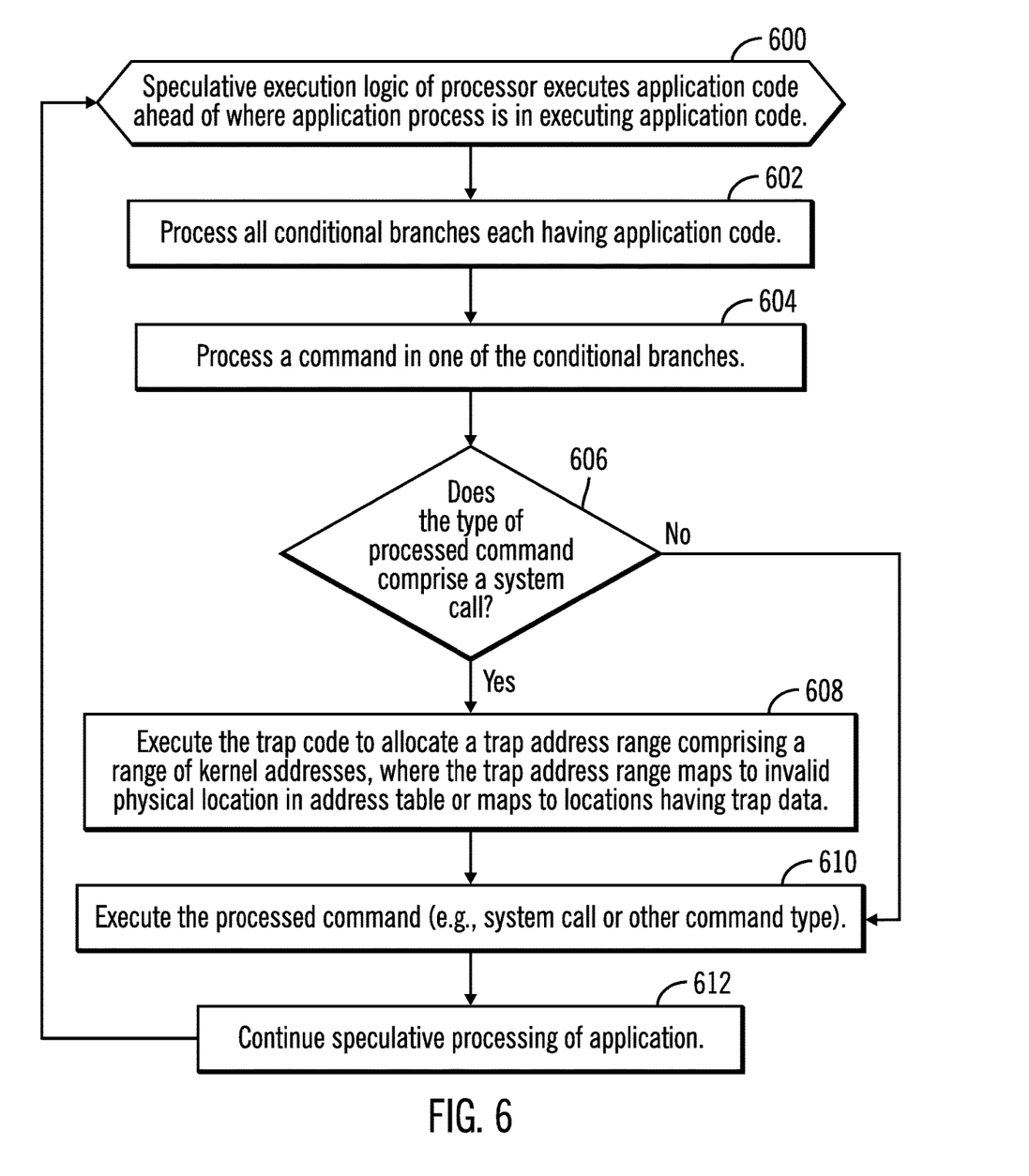
FIG. 6 illustrates an embodiment of operations by a speculative execution process to inject trap code while performing speculative execution of the application code to allocate the trap address range to detect malicious code.

FIG. 6 illustrates an embodiment of operations performed by the processor 102 performing speculative execution ahead of where the application process 110 is executing the application code 112 in the execution path. While speculatively processing the application code 112, the processor 102 processes (at block 602) conditional branches in the application code 112, where a condition or parameter value set during previously executed application code 112 determines which branch in the code to take. The processor 102 processes the application code 112 in all branches to make any parameters and data available regardless of the branch the application process 110 processes when reaching that conditional branch. Upon processing (at block 604) a command in one of the conditional branches, the processor 102 determines (at block 606) whether the type of processed command comprises a system call or other access to the kernel mode and kernel address space. If so, the processor 102 executes (at block 608) the trap code 124 to allocate a trap address range, comprising a range of kernel addresses, which map to invalid location in the address table 118 or maps to locations having trap data 128. After processing the trap code 124 (from block 608) or if the processed command does not comprise a system call (from the no branch of block 606), the processor 102 speculatively executes (at block 610) the processed command and continues (at block 612) speculative execution of the application code 112 by proceeding back to block 600.

With the embodiment of FIG. 6, a system call triggers allocation of a trap address range during speculative execution of the application code 112. If the application process 110 takes the other branch not having the system call, which is likely to be a far more frequently traversed branch, then the code in that branch will have been speculatively executed, thus providing the benefits of speculative execution for the more frequently traversed branch. In this way, described embodiments, allow the benefits of speculative execution to be realized for the most frequent processing paths, while allocating trap address ranges in branches having system calls to be able to trap a malicious program 126 seeking to access kernel addresses. The malicious code 126 will see that the trap addresses were allocated in the conditional branch and attempt to access those trap addresses believing they were allocated as part of a system call, and may contain sensitive information, such as personal data, passwords, etc.

In alternative embodiments, the trap code 124 may be executed after the system call is executed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
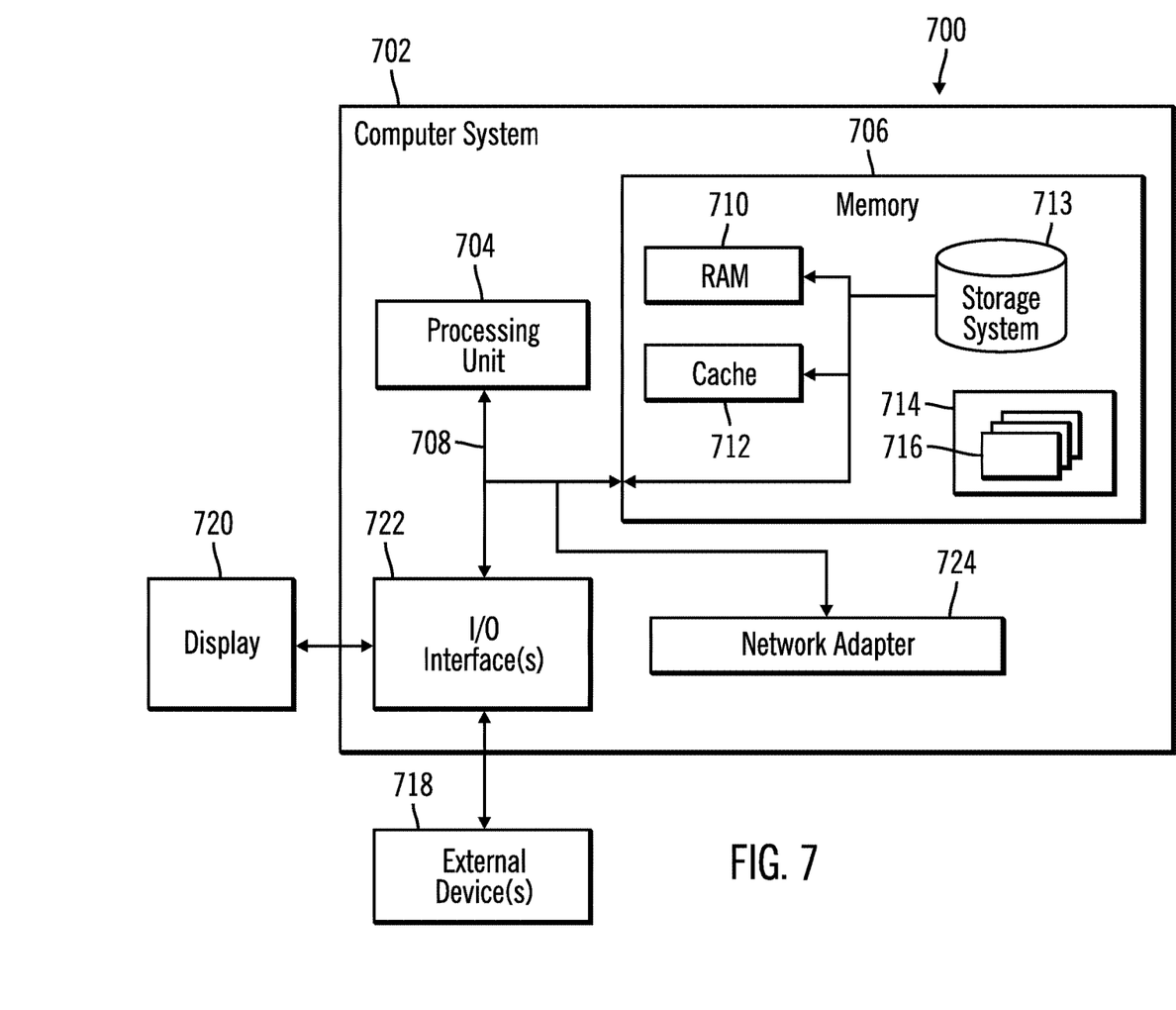
FIG. 7 illustrates a computing environment in which the components of FIG. 1 may be implemented

The computational components of FIG. 1, including the computer system 100, may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for detecting potentially malicious code accessing data from a storage, the computer program product comprising a computer readable storage medium having computer readable program code embodied therein that when executed performs operations, the operations comprising:
processing a specified type of command in application code;
executing trap code in response to processing the specified type of command to allocate a trap address range;
executing the specified type of command and continuing to execute the application code in response to executing the trap code;
determining whether an accessing application accesses the trap address range; and
performing at least one of transmitting a notification that the accessing application comprises potentially malicious code, monitoring the execution of the accessing application, and restricting execution of the accessing application in response to determining that the accessing application accessed the trap address range.

2. The computer program product of claim 1, wherein the trap address range is not accessed by the application code being executed.

3. The computer program product of claim 1, wherein the specified type of command comprises a command to switch from a user mode to kernel mode to access kernel addresses, and wherein the trap address range is defined in a kernel address space.

4. The computer program product of claim 3, wherein the operations further comprise:
receiving a segmentation fault in response to the accessing application accessing an address in the kernel address space not mapped in an address table to valid data in a cache, wherein the determining whether the accessing application has accessed the trap address range is performed in response to receiving the segmentation fault.

5. The computer program product of claim 4, wherein the specified type of command comprises a system call, wherein the system call is executed after executing the trap code.

6. The computer program product of claim 1, wherein the trap address range maps to invalid physical addresses in an address table, wherein the determining whether the accessing application has accessed the trap address range comprises detecting a fault generated when the accessing application accesses the trap address range mapping to invalid locations.

7. The computer program product of claim 1, wherein the executing the trap code maps the trap address range in an address table, wherein the determining whether the accessing application has accessed the trap address range comprises detecting that the accessing application attempts to use trap data from the trap address range to access computational resources.

8. The computer program product of claim 1, wherein multiple trap address ranges are allocated in response to multiple instances of executing the trap code.

9. The computer program product of claim 1, wherein the executing the application code speculatively executes both branches of conditional branches of the application code, wherein a result of only one of the conditional branches is maintained depending on a condition used to determine which of the conditional branches to traverse.

10. The computer program product of claim 9, wherein the trap code is executed in a conditional branch of the conditional branches speculatively by a processor when processing the conditional branches.

11. A system for detecting potentially malicious code accessing data from a storage, comprising:
processor; and
a computer readable storage medium having computer readable program that when executed by the processor performs operations, the operations comprising:
processing a specified type of command in application code;
executing trap code in response to processing the specified type of command to allocate a trap address range;
executing the specified type of command and continuing to execute the application code in response to executing the trap code;
determining whether an accessing application accesses the trap address range; and
performing at least one of transmitting a notification that the accessing application comprises potentially malicious code, monitoring the execution of the accessing application, and restricting execution of the accessing application in response to determining that the accessing application accessed the trap address range.

12. The system of claim 11, wherein the specified type of command comprises a command to switch from a user mode to kernel mode to access kernel addresses, and wherein the trap address range is defined in a kernel address space.

13. The system of claim 12, wherein the operations further comprise:
receiving a segmentation fault in response to the accessing application accessing an address in the kernel address space not mapped in an address table to valid data in a cache, wherein the determining whether the accessing application has accessed the trap address range is performed in response to receiving the segmentation fault.

14. The system of claim 13, wherein the specified type of command comprises a system call, wherein the system call is executed after executing the trap code.

15. The system of claim 11, wherein the trap address range maps to invalid physical addresses in an address table, wherein the determining whether the accessing application has accessed the trap address range comprises detecting a fault generated when the accessing application accesses the trap address range mapping to invalid locations.

16. The system of claim 11, wherein the executing the trap code maps the trap address range in an address table, wherein the determining whether the accessing application has accessed the trap address range comprises detecting that the accessing application attempts to use trap data from the trap address range to access computational resources.

17. The system of claim 11, wherein the processor executing the application code speculatively executes both branches of conditional branches of the application code, wherein a result of only one of the conditional branches is maintained depending on a condition used to determine which of the conditional branches to traverse.

18. The system of claim 17, wherein the trap code is executed in a conditional branch of the conditional branches speculatively by a processor when processing the conditional branches.

19. A method for detecting potentially malicious code accessing data from a storage, comprising:
processing a specified type of command in application code;

executing trap code in response to processing the specified type of command to allocate a trap address range;

executing the specified type of command and continuing to execute the application code in response to executing the trap code;

determining whether an accessing application accesses the trap address range; and performing at least one of transmitting a notification that the accessing application comprises potentially malicious code, monitoring the execution of the accessing application, and restricting execution of the accessing application in response to determining that the accessing application accessed the trap address range.

20. The method of claim 19, wherein the specified type of command comprises a command to switch from a user mode to kernel mode to access kernel addresses, and wherein the trap address range is defined in a kernel address space.

21. The method of claim 20, further comprising:

receiving a segmentation fault in response to the accessing application accessing an address in the kernel address space not mapped in an address table to valid data in a cache, wherein the determining whether the accessing application has accessed the trap address range is performed in response to receiving the segmentation fault.

22. The method of claim 21, wherein the specified type of command comprises a system call, wherein the system call is executed after executing the trap code.

23. The method of claim 19, wherein the trap address range maps to invalid physical addresses in an address table, wherein the determining whether the accessing application has accessed the trap address range comprises detecting a fault generated when the accessing application accesses the trap address range mapping to invalid locations.

24. The method of claim 19, wherein the executing the trap code maps the trap address range in an address table, wherein the determining whether the accessing application has accessed the trap address range comprises detecting that the accessing application attempts to use trap data from the trap address range to access computational resources.

25. The method of claim 19, wherein the executing the application code speculatively executes both branches of conditional branches of the application code, wherein a result of only one of the conditional branches is maintained depending on a condition used to determine which of the conditional branches to traverse.

26. The method of claim 25, wherein the trap code is executed in a conditional branch of the conditional branches speculatively by a processor when processing the conditional branches.

* * * * *